(12) United States Patent
Onishi et al.

(10) Patent No.: US 10,845,298 B2
(45) Date of Patent: Nov. 24, 2020

(54) METHOD OF MEASURING ADHESIVE STRENGTH

(71) Applicant: NGK INSULATORS, LTD., Aichi (JP)

(72) Inventors: Ryo Onishi, Iwakura (JP); Yosuke Adachi, Nagoya (JP); Takashi Hino, Kasugai (JP)

(73) Assignee: NGK INSULATORS, LTD., Nagoya (JP)

( * ) Notice: Subject to any disclaimer, the term of this patent is extended or adjusted under 35 U.S.C. 154(b) by 142 days.

(21) Appl. No.: 16/240,810

(22) Filed: Jan. 7, 2019

(65) Prior Publication Data

US 2019/0212247 A1 Jul. 11, 2019

(30) Foreign Application Priority Data

Jan. 9, 2018 (JP) .................. 2018-001443

(51) Int. Cl.
| | |
|---|---|
| *G01N 19/04* | (2006.01) |
| *F16B 11/00* | (2006.01) |
| *G01N 27/407* | (2006.01) |
| *B29C 65/48* | (2006.01) |
| *G01N 27/403* | (2006.01) |

(52) U.S. Cl.
CPC .............. *G01N 19/04* (2013.01); *B29C 65/48* (2013.01); *F16B 11/006* (2013.01); *G01N 27/403* (2013.01); *G01N 27/407* (2013.01); *G01N 2203/0091* (2013.01)

(58) Field of Classification Search
CPC ...................... G01N 19/04; G01N 2203/0091
See application file for complete search history.

(56) References Cited

U.S. PATENT DOCUMENTS 5,696,327 A * 12/1997 Huang ................... G01N 19/04
156/765

FOREIGN PATENT DOCUMENTS

| JP | 2007-101387 A | 4/2007 |
|---|---|---|
| JP | 2016-109685 A | 6/2016 |

* cited by examiner

*Primary Examiner* — Paul M. West
(74) *Attorney, Agent, or Firm* — Mattingly & Malur, PC

(57) ABSTRACT

A method of measuring adhesive strength between an element body and a porous protection layer that are included in a sensor element includes (a) a step of holding a portion of the element body where the porous protection layer is absent with an elastic force exerted by a holding jig, and placing a peeling jig at a position between the porous protection layer and the holding jig in the longitudinal direction such that the element body is allowed to move in the longitudinal direction while the porous protection layer is prevented from moving in the longitudinal direction toward the holding jig; and (b) a step of moving, after the step (a), the peeling jig pushes the porous protection layer in the longitudinal direction, and measuring the adhesive strength of the porous protection layer.

8 Claims, 6 Drawing Sheets

METHOD OF MEASURING ADHESIVE STRENGTH

BACKGROUND OF THE INVENTION

1. Field of the Invention

The present invention relates to a method of measuring adhesive strength.

2. Description of the Related Art

There are hitherto known gas sensor elements that each detect the concentration of a specific gas, such as NOx, contained in a measurement-object gas, such as exhaust gas from an automobile. A known example of such a gas sensor element includes an element body and a porous protection layer that covers the surface of the element body (see PTL 1, for example).

It is also known that, in a gas sensor element, the adhesive strength of a side conducting portion exposed to the outside on a side face of a multilayer body is measured by the Sebastian method (see PTL 2, for example). FIGS. 9A and 9B include schematic diagrams illustrating how the adhesive strength of a film 92 is measured by the Sebastian method. To measure the adhesive strength of the film 92 with respect to a substrate 91 by the Sebastian method, a stud pin 93 is first bonded to the surface of the film 92 with adhesive 94 (see FIG. 9A). Subsequently, a load (a pull load) is applied to the stud pin 93, and the stud pin 93 is moved upward, whereby a film 92a, which is a portion of the film 92, is peeled off (see FIG. 9B). The adhesive strength of the film 92 is thus measured as a load [N] applied to the stud pin 93 at the peeling of the film 92a.

CITATION LIST

Patent Literature

PTL 1 JP 2016-109685 A
PTL 2 JP 2007-101387 A

SUMMARY OF THE INVENTION

The adhesive strength of the porous protection layer described above with respect to the element body is occasionally desired to be measured for confirmation that the porous protection layer does not peel off even if there is a difference in thermal expansion coefficient between the porous protection layer and the element body, an external mechanical impact (such as vibration of the automobile), or the like. In such a case, as with the case of the side conducting portion, the adhesive strength of the porous protection layer may be measured by the Sebastian method. However, the Sebastian method has a problem in that there is a wide variation in the measured adhesive strength in the case of the porous protection layer.

The present invention is to solve the above problem and chiefly aims to reduce the variation in the measured adhesive strength of the porous protection layer.

To achieve the above chief aim, the present invention provides the following.

A method of measuring adhesive strength according to the present invention is a method of measuring adhesive strength between an element body and a porous protection layer that are included in a sensor element configured to detect a concentration of a specific gas contained in a measurement-object gas, the element body having a long shape, the porous protection layer covering part of a surface of the element body that extends in a longitudinal direction of the element body, the method including:

(a) a step of holding a portion of the element body where the porous protection layer is absent with an elastic force exerted by a holding jig, and placing a peeling jig at a position between the porous protection layer and the holding jig in the longitudinal direction such that the element body is allowed to move in the longitudinal direction while the porous protection layer is prevented from moving in the longitudinal direction toward the holding jig; and (b) a step of moving, after the step (a), the holding jig and the peeling jig relative to each other and away from each other in the longitudinal direction such that the peeling jig pushes the porous protection layer in the longitudinal direction, and measuring the adhesive strength of the porous protection layer with reference to a load applied to at least one of the holding jig and the peeling jig when the porous protection layer peels off the element body.

In the above method of measuring adhesive strength, since the peeling jig pushes the porous protection layer in the longitudinal direction of the element body, the porous protection layer is peeled off the element body. With reference to the load applied at the peeling, the adhesive strength of the porous protection layer is measured. In the above method of measuring adhesive strength, the variation in the measured adhesive strength can be made smaller than in, for example, the Sebastian method, which is the prior-art method. This is considered to be because of the following reason. In the Sebastian method, a stud pin and an object of measurement are bonded to each other with adhesive. If the object of measurement is a porous body (in the present invention, the porous protection layer), the area of adhesion and the force of adhesion between the stud pin and the porous protection layer tend to vary with the degree of permeation of the adhesive into pores of the porous protection layer. This variation varies the magnitude and the range of the force applied to the porous protection layer when the stud pin is moved upward. Consequently, the measured value varies. In the method of measuring adhesive strength according to the present invention, the adhesive strength can be measured without using adhesive. Therefore, even if the object of measurement is the porous protection layer, the variation in the measured value is considered to be small.

In the method of measuring adhesive strength according to the present invention, the peeling jig may have a through hole into which the element body is insertable, the through hole may have a size and shape that allows the portion of the element body where the porous protection layer is absent to pass through the through hole in the longitudinal direction and prevents a portion of the sensor element where the porous protection layer is present from passing through the through hole in the longitudinal direction, and, in the step (a), the peeling jig may be positioned by inserting the element body into the through hole. In such a case, when the element body is inserted into the through hole of the peeling jig, the peeling jig can be positioned such that the element body is allowed to move in the longitudinal direction while the porous protection layer is prevented from moving. Thus, the peeling jig can be positioned relatively easily.

In the above case, the through hole of the peeling jig may have a size and shape with which a gap ratio defined as (a length of a gap between an inner circumferential surface of the through hole and the element body)/(a thickness of the porous protection layer) and derived in a direction perpendicular to the surface of the element body becomes 0.3 or greater and 0.7 or smaller in a state where the element body is set in the through hole in the step (a). If the gap ratio is 0.3 or greater, at least one of the following advantageous effects is obtained, for example: the element body can be easily inserted into the through hole of the peeling jig in the step (a), and the occurrence of an error in the adhesive strength that may be caused by the frictional force generated at the contact between the peeling jig and the element body in the step (b) can be suppressed. If the gap ratio is 0.7 or smaller, the porous protection layer can be more assuredly peeled off the element body by using the peeling jig.

Herein, the expression "the gap ratio derived in a direction perpendicular to the surface of the element body becomes 0.3 or greater and 0.7 or smaller" implies that, at a position on at least any of the surfaces of the element body, the gap ratio derived in a direction perpendicular to that surface is 0.3 or greater and 0.7 or smaller. Furthermore, at a position on any of the surfaces of the element body that are covered by the porous protection layer, the gap ratio derived in a direction perpendicular to that surface is preferably 0.3 or greater and 0.7 or smaller. That is, in the state where the element body is set in the through hole in the step (a), it is preferable that there be no area where the gap ratio is out of the range of 0.3 or greater and 0.7 or smaller.

In the method of measuring adhesive strength according to the present invention, the porous protection layer and the peeling jig may have respective preventing portions at respective positions that come into contact with each other in the step (b), the preventing portions preventing, when fitting each other, the porous protection layer and the peeling jig from moving in a predetermined direction perpendicular to the longitudinal direction. In such a case, since the preventing portion of the porous protection layer and the preventing portion of the peeling jig fit each other in the step (b) and thus prevent the porous protection layer and the peeling jig from moving in the predetermined direction perpendicular to the longitudinal direction, the displacement between the porous protection layer and the peeling jig in that direction that may occur in the step (b) is suppressed. Consequently, the variation in the measured adhesive strength can be made much smaller. In such a case, one of the preventing portion of the porous protection layer and the preventing portion of the peeling jig may be a projection, while the other may be a recess that fits the projection.

In the method of measuring adhesive strength according to the present invention, the holding jig may include an elastic member in a portion that comes into contact with the element body in the step (a), the elastic member having a hardness of 60 or greater and 1300 or smaller, the hardness being measured with a type-A durometer in accordance with JIS K 6253-3:2012. If the hardness of the elastic member is 60 or greater, the coming off of the element body from the holding jig that may occur in the step (b) can be suppressed. If the hardness of the elastic member is 1300 or smaller, the breakage of the element body that may occur under the holding force exerted by the holding jig can be suppressed.

In the method of measuring adhesive strength according to the present invention, a speed at which the holding jig and the peeling jig move away from each other in the step (b) may be set to 0.8 mm/sec or higher and 1.2 mm/sec or lower. If the speed is set to 0.8 mm/sec or higher, the occurrence of a phenomenon other than peeling, such as slight and gradual damage to the porous protection layer, can be suppressed. Consequently, measurement accuracy is improved. If the speed is set to 1.2 mm/sec or lower, at least one of the following advantageous effects is obtained: the error in the load measurement that may be caused by high speed can be reduced, and the coming off of the element body from the holding jig can be suppressed.

In the method of measuring adhesive strength according to the present invention, the porous protection layer may have a thickness of 40 µm or greater and 800 µm and smaller. If the porous protection layer has a thickness of 40 µm or greater, the peeling jig can easily push the porous protection layer in the longitudinal direction in the step (b). That is, the porous protection layer can be easily peeled off by using the peeling jig.

In the method of measuring adhesive strength according to the present invention, the porous protection layer may have a porosity of 20% or higher and 50% or lower. If the porous protection layer has a porosity of 20% or higher, the adhesive strength measured by the Sebastian method tends to vary because of the reasons described above. Therefore, the method according to the present invention is worth employing in such a case.

DETAILED DESCRIPTION OF THE INVENTION

Figure 1:
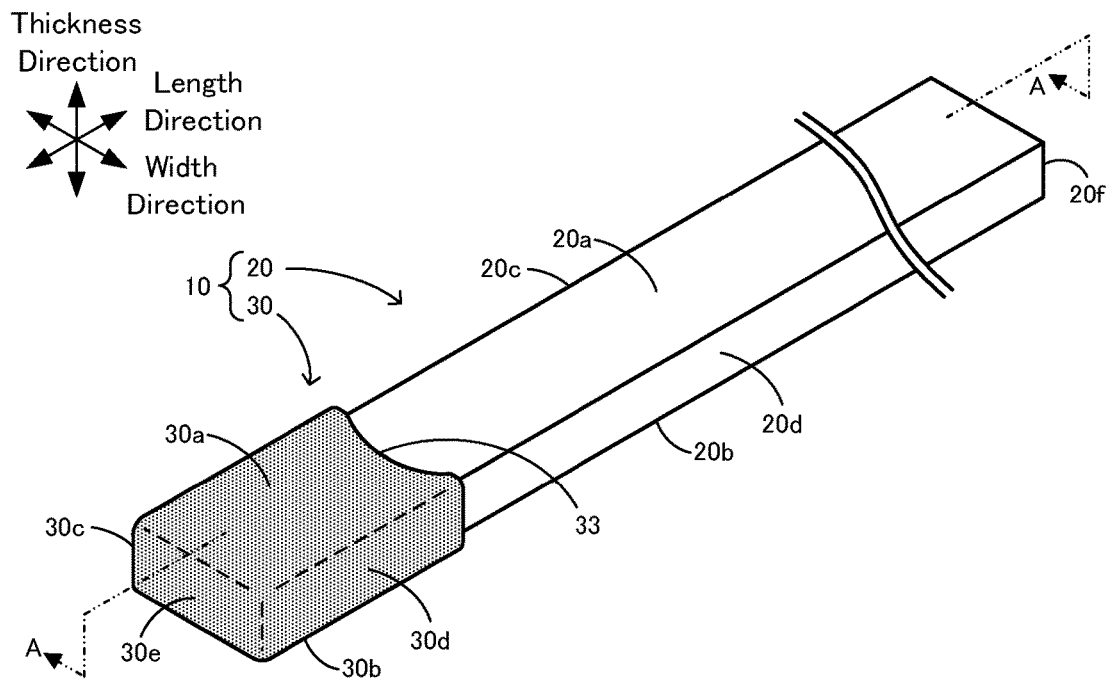
FIG. 1 is a perspective view of a sensor element 10.
Figure 2:
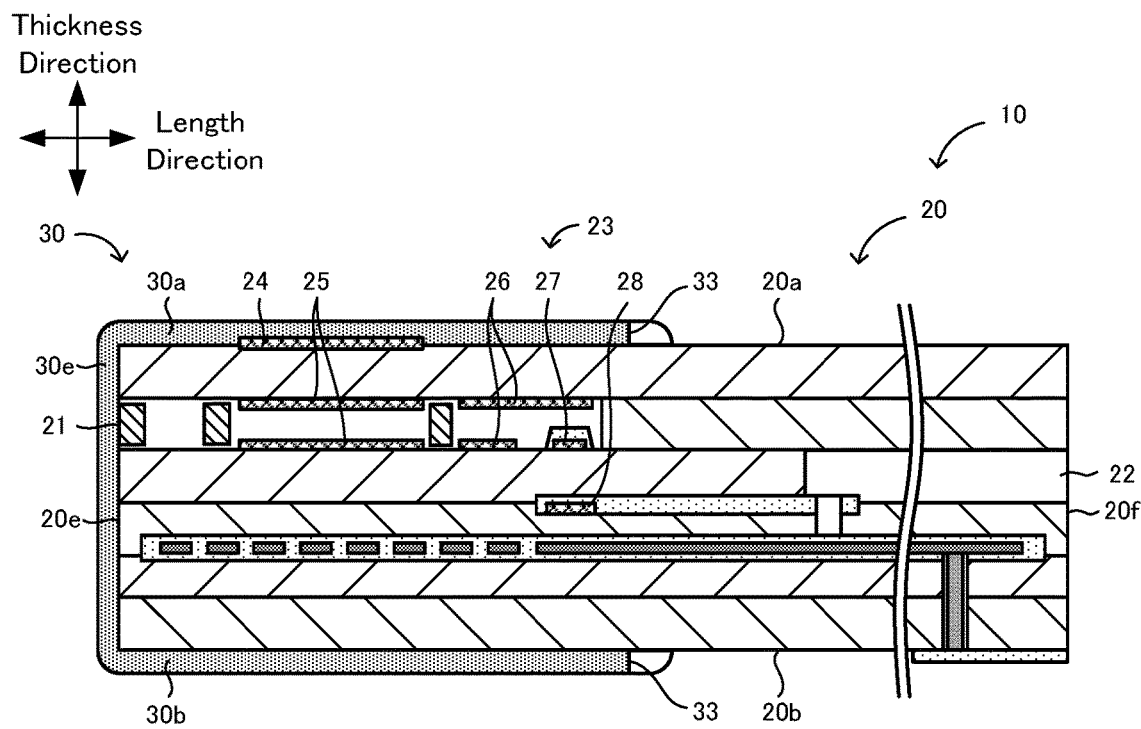
FIG. 2 is a sectional diagram taken along line A-A illustrated in FIG. 1.

Embodiments of the present invention will now be described with reference to the drawings. First, an exemplary sensor element configured to measure adhesive strength by the method according to the present invention will be described. FIG. 1 is a perspective view of a sensor element 10. FIG. 2 is a sectional diagram taken along line A-A illustrated in FIG. 2. A element body 20 of the sensor element 10 has a multilayer structure in a long, rectangular-parallelepiped shape. The longitudinal direction (the horizontal direction in FIG. 2) of the element body 20 is defined as the length direction, and the layered direction (the vertical direction in FIG. 2) of the element body 20 is defined as the thickness direction. Furthermore, a direction perpendicular to both the length direction and the thickness direction is defined as the width direction of the element body 20.

The sensor element 10 is attached to, for example, a pipe such as an exhaust-gas pipe of a vehicle and is used for measuring the concentration of a specific gas, such as NOx or $O_2$, (the specific-gas concentration) contained in the exhaust gas as a measurement-object gas. In the present embodiment, the sensor element 10 measures the NOx concentration as the specific-gas concentration. The sensor element 10 includes the element body 20 and a porous protection layer 30 that covers part of the surface of the element body 20.

The element body 20 forms a multilayer body in which a plurality of oxygen-ion-conductive solid-electrolyte layers each made of zirconia ($ZrO_2$) or the like are stacked one on top of another. As illustrated in FIGS. 1 and 2, the element body 20 having the rectangular-parallelepiped shape has outer surfaces defined as first to sixth surfaces 20a to 20f. The first and second surfaces 20a and 20b are at two respective thickness-direction ends of the element body 20. The third and fourth surfaces 20c and 20d are at two respective width-direction ends of the element body 20. The fifth and sixth surfaces 20e and 20f are at two respective length-direction ends of the element body 20. The fifth surface 20e is also referred to as the front end surface. The sixth surface 20f is also referred to as the rear end surface. A side of the element body 20 that is nearer to the fifth surface 20e is also referred to as the front-end side. A side of the element body 20 that is nearer to the sixth surface 20f is also referred to as the rear-end side. The element body 20 may have, for example, a length of 25 mm or greater and 100 mm or smaller, a width of 2 mm or greater and 10 mm or smaller, and a thickness of 0.5 mm or greater and 5 mm or smaller.

The element body 20 has a measurement-object-gas inlet 21 provided in the fifth surface 20e and from which the measurement-object gas is introduced into the element body 20, a reference-gas inlet 22 provided in the sixth surface 20f and from which a reference gas (atmosphere) serving as a reference for the detection of specific-gas concentration is introduced into the element body 20, and a detecting portion 23 that detects the concentration of the specific gas contained in the measurement-object gas. The detecting portion 23 includes at least one electrode. Specifically, the detecting portion 23 includes an outer electrode 24 that is provided on the first surface 20a; and an inner main pump electrode 25, an inner subsidiary pump electrode 26, a measuring electrode 27, and a reference electrode 28 that are provided inside the element body 20. The inner main pump electrode 25 and the inner subsidiary pump electrode 26 may each extend along an inner circumferential surface of a space provided inside the element body 20 and have a tunnel shape. The principle of detection of specific-gas concentration by the detecting portion 23 is publicly known and is also described in, for example, PTL 1 described above. Therefore, detailed description of the principle is omitted.

The porous protection layer 30 is a porous body that covers part of the first to fourth surfaces 20a to 20d of the element body 20, i.e., the surfaces each extending in the longitudinal direction of the element body 20. In the present embodiment, the porous protection layer 30 includes first to fifth protection layers 30a to 30e provided respectively on five (the first to fifth surfaces 20a to 20e) of the six surfaces of the element body 20. Adjacent ones of the first to fifth protection layers 30a to 30e are connected to each other. Accordingly, the porous protection layer 30 as a whole covers the front end surface (the fifth surface 20e) of the element body 20 and peripheral part thereround. The first and second protection layers 30a and 30b each have a recess 33 (an exemplary preventing portion) on the rear-end side thereof (the side facing toward the sixth surface 20f). The recess 33 becomes deeper toward the width-direction center of a corresponding one of the first and second protection layers 30a and 30b. The porous protection layer 30 covers part of the element body 20 and thus protects the part. The porous protection layer 30 has a function of, for example, suppressing the cracking of the element body 20 that may occur with the adhesion of water or the like contained in the measurement-object gas.

The porous protection layer 30 is a porous body such as an alumina porous body, a zirconia porous body, a spinel porous body, a cordierite porous body, a titania porous body, a magnesia porous body, or the like. In the present embodiment, the porous protection layer 30 is an alumina porous body. The thickness of the porous protection layer 30 may be, for example, 40 μm or greater, 800 μm or smaller, or 40 μm or greater and 800 μm or smaller. In the present embodiment, the first to fifth protection layers 30a to 30e all have the same thickness. Alternatively, the first to fifth protection layers 30a to 30e may have different thicknesses. The porosity of the porous protection layer 30 may be, for example, 20% or higher, 10% or higher and 50% or lower, or 20% or higher and 50% or lower. The porosity of the porous protection layer 30 is a value measured by mercury porosimetry according to JIS R 1655. An arithmetic-mean roughness Ra of the porous protection layer 30 at a surface thereof that comes into contact with the element body 20 may be, for example, 0.3 μm or greater and 1.0 μm or smaller. An arithmetic-mean roughness Ra of the element body 20 at a surface thereof (in the present embodiment, each of the first to fifth surfaces 20a to 20e) that comes into contact with the porous protection layer 30 may be, for example, 0.3 μm or greater and 1.0 μm or smaller. The porous protection layer 30 may be formed by any of various methods such as gel casting, screen printing, dipping, plasma spraying, and the like.

Figure 3:
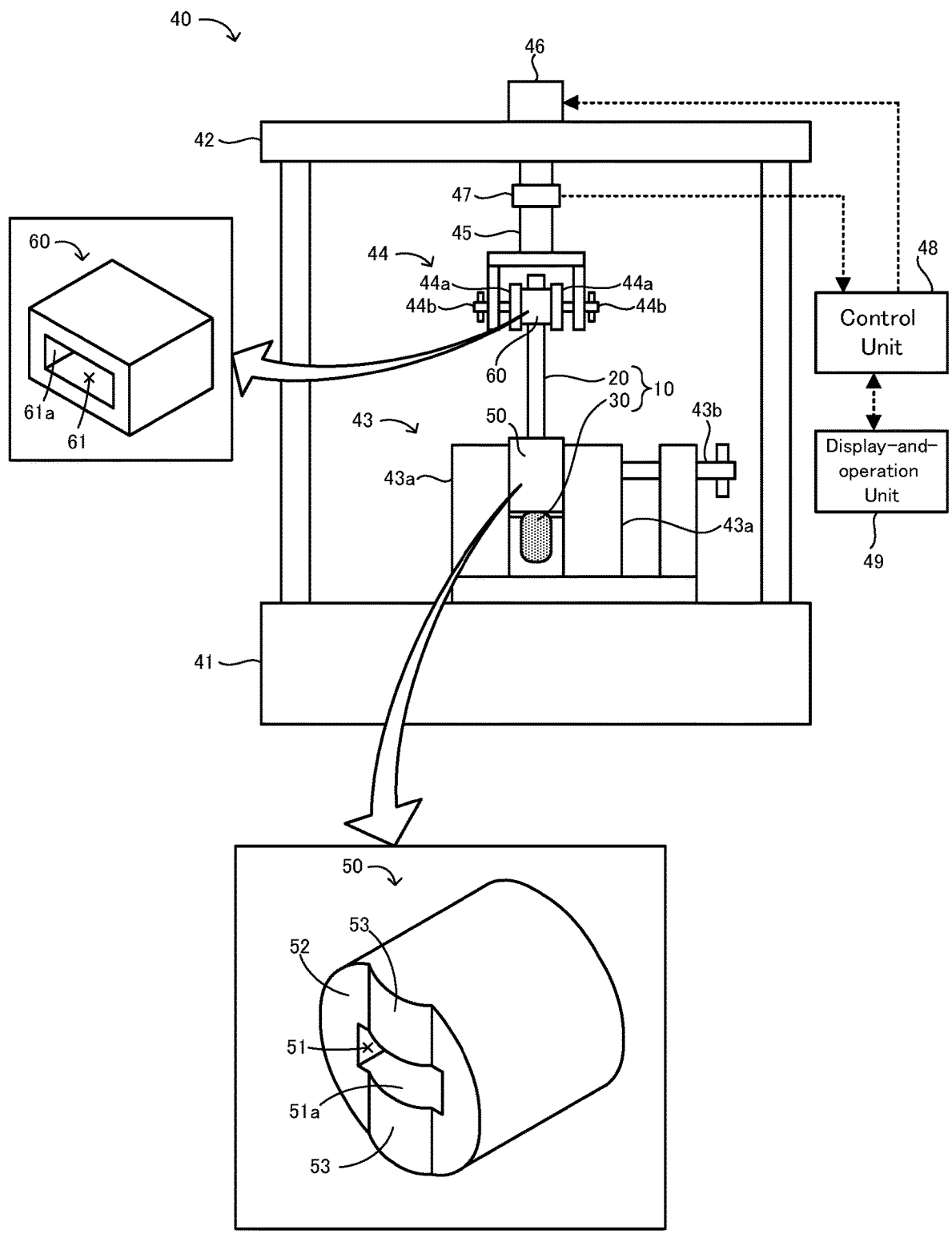
FIG. 3 is a diagram illustrating an adhesive-strength-measuring machine 40.
Figure 4A:
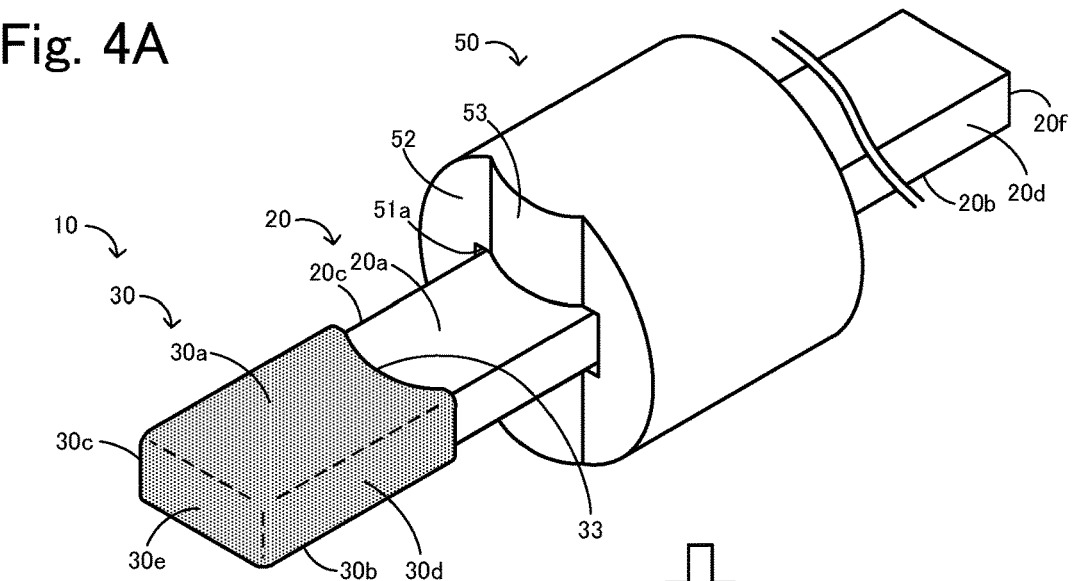
FIGS. 4A to 4C include diagrams illustrating how a peeling jig 50 and a holding jig 60 are attached to the sensor element 10.
Figure 4B:
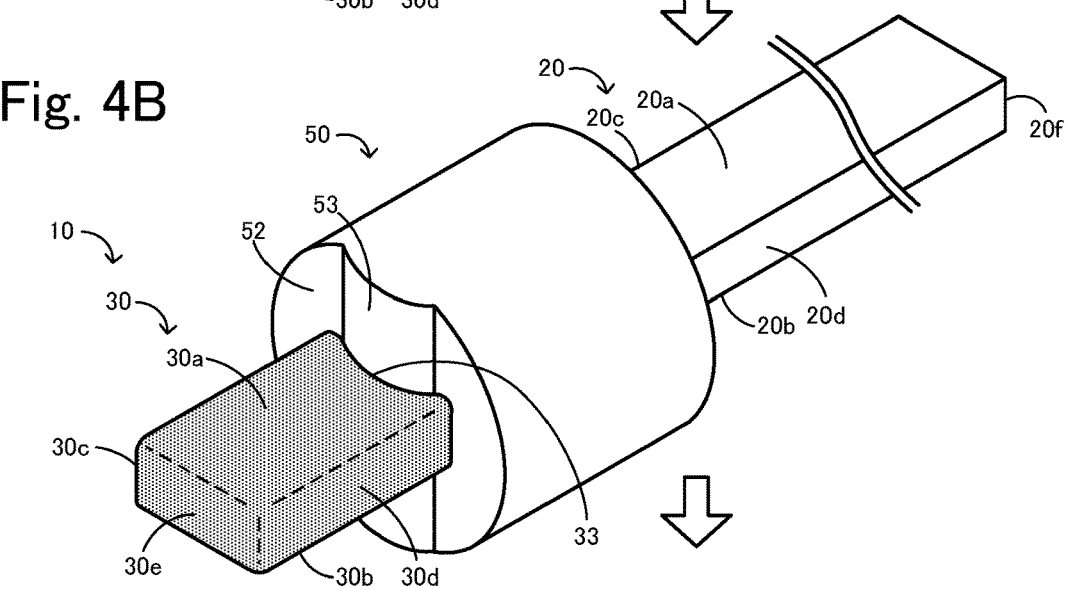
Figure 4C:
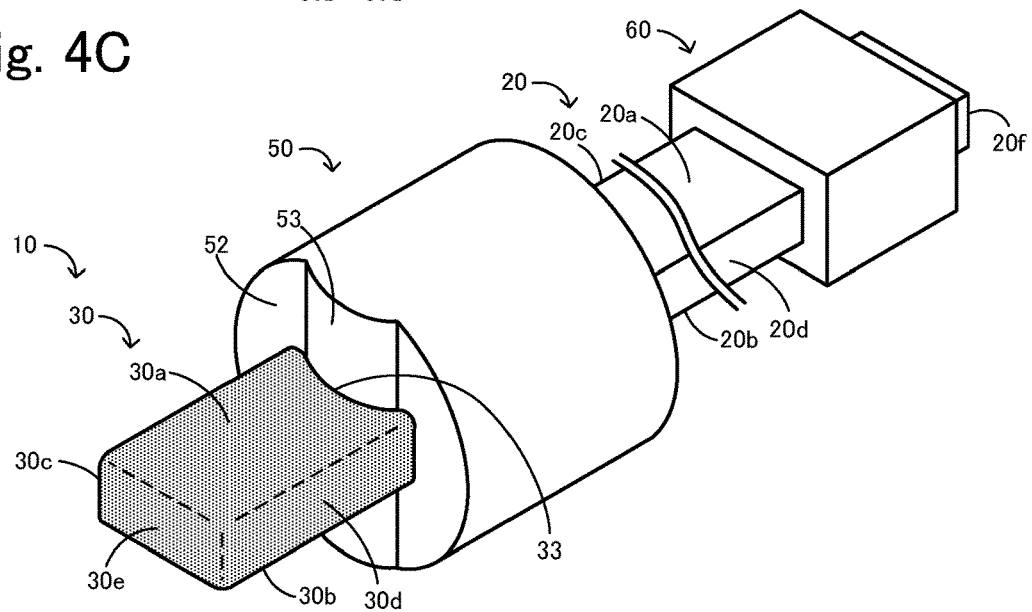
Figure 5A:
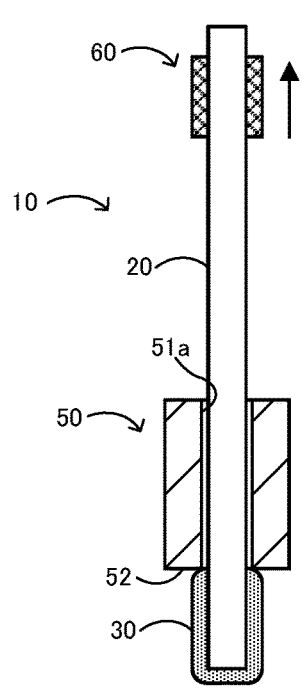
FIGS. 5A and 5B include schematic sectional diagrams illustrating how a porous protection layer 30 is peeled off.
Figure 5B:
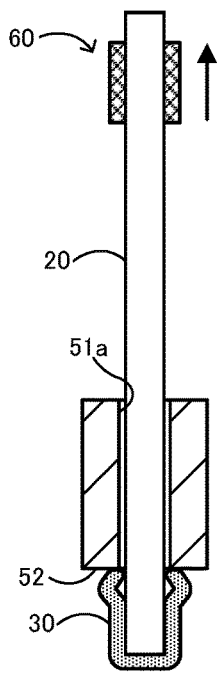

Now, a method of measuring the adhesive strength between the porous protection layer 30 and the element body 20 included in the sensor element 10 configured as above will be described. FIG. 3 is a diagram illustrating an adhesive-strength-measuring machine 40. FIGS. 4A to 4C include diagrams illustrating how a peeling jig 50 and a holding jig 60 are attached to the sensor element 10. FIGS. 5A and 5B include schematic sectional diagrams illustrating how the porous protection layer 30 is peeled off.

A method of measuring adhesive strength according to the present embodiment includes:

(a) a step of holding a portion of the element body 20 where the porous protection layer 30 is absent with an elastic force exerted by the holding jig 60, and placing the peeling jig 50 at a position between the porous protection layer 30 and the holding jig 60 in the longitudinal direction of the element body 20 such that the element body 20 is allowed to move in the longitudinal direction while the porous protection layer 30 is prevented from moving toward the holding jig 60 in the longitudinal direction; and (b) a step of moving, after the step (a), the holding jig 60 and the peeling jig 50 relative to each other and away from each other in the longitudinal direction of the element body 20 such that the peeling jig 50 pushes the porous protection layer 30 in the longitudinal direction of the element body 20, and measuring the adhesive strength of the porous protection layer 30 with reference to a load applied to at least one of the holding jig 60 and the peeling jig 50 when the porous protection layer 30 peels off the element body 20.

First, the adhesive-strength-measuring machine 40 used in the method of measuring adhesive strength will be described. As illustrated in FIG. 3, the adhesive-strength-measuring machine 40 includes a lower base 41, an upper base 42, a peeling-jig-fixing unit 43, an element-body-holding unit 44, a rod 45, a servo motor 46, a load cell 47, a control unit 48, and a display-and-operation unit 49. The upper base 42 is spaced apart from the lower base 41 and is fixed at the top. The peeling-jig-fixing unit 43 is provided on the lower base 41 and fixes the peeling jig 50. The element-body-holding unit 44 is attached to the lower side of the upper base 42 and holds the element body 20 with the aid of the holding jig 60. The rod 45 is a member connected to the element-body-holding unit 44. The servo motor 46 is provided on the upper base 42 and moves the element-body-holding unit 44 up and down by moving the rod 45 up and down. The load cell 47 is attached to the rod 45 and detects the load [N] applied to the rod 45. The control unit 48 controls the entirety of the adhesive-strength-measuring machine 40. The display-and-operation unit 49 is in the form of a touch-panel liquid-crystal display or the like including a function as a display and a function as an operation unit. The peeling jig 50 is a member for peeling off the porous protection layer 30. The holding jig 60 is a member for holding the element body 20 with an elastic force.

The peeling-jig-fixing unit 43 includes a pair of pinching members 43a between which the peeling jig 50 is pinched and fixed, and an externally threaded member 43b that meshes with an internal threaded portion, not illustrated, provided in one of the pinching members 43a and thus moves the one pinching member 43a toward and away from the other pinching member 43a. The element-body-holding unit 44 includes a pair of pinching members 44a between which the holding jig 60 is pinched and fixed, and externally threaded members 44b that each mesh with a corresponding one of internal threaded portions, not illustrated, provided in the respective pinching members 44a and thus move the pinching members 44a toward and away from each other. The element-body-holding unit 44 is hung from the upper base 42 with the aid of the rod 45 and is moved up and down with a driving force exerted by the servo motor 46. Thus, the peeling-jig-fixing unit 43 and the element-body-holding unit 44 move relative to each other and toward and away from each other.

The control unit 48 is a publicly known microcomputer including a CPU, a ROM, a RAM, and so forth. The control unit 48 outputs a control signal to the servo motor 46 and thus controls the up-and-down movement of the element-body-holding unit 44 and the speed of the movement. The control unit 48 receives a detection signal from the load cell 47 and measures the load applied to the holding jig 60 through the rod 45 and the element-body-holding unit 44. The control unit 48 outputs a display signal for causing the display-and-operation unit 49 to display an image, and receives an operation signal from the display-and-operation unit 49.

The peeling jig 50 is a substantially round-columnar member and has a through hole 51 extending therethrough in the axial direction of the round columnar shape and into which the element body 20 is insertable. The peeling jig 50 has an end surface 52 as a contact surface that comes into contact with the porous protection layer 30 when the porous protection layer 30 is peeled off, and projections 53 (exemplary preventing portions) each projecting from part of the end surface 52. The through hole 51 has a size and shape that allows the element body 20 to be inserted thereinto and prevents the porous protection layer 30 from being inserted thereinto. In the present embodiment, a section of the through hole 51 that is taken perpendicularly to the axial direction of the round columnar peeling jig 50 has a rectangular shape. The end surface 52 is at one axial end of the peeling jig 50. The projections 53 are arranged on two respective sides of the through hole 51 in the vertical direction in the enlarged diagram included in FIG. 3. The projections 53 each have a shape that conforms to the shape of a corresponding one of the recesses 33 of the first and second protection layers 30a and 30b so as to be fitted into the respective recesses 33 in the step (b). The peeling jig 50 is made of, for example, metal, ceramic, or the like. The peeling jig 50 preferably has a low bulk modulus.

The holding jig 60 is a substantially rectangular-parallelepiped member and has a through hole 61 extending therethrough in the axial direction and into which the element body 20 is insertable. A section of the through hole 61 that is taken perpendicularly to the axial direction of the holding jig 60 has a rectangular shape. At least a portion of the holding jig 60 that comes into contact with the element body 20 when the holding jig 60 holds the element body 20, that is, a portion of the holding jig 60 that includes an inner circumferential surface 61a of the through hole 61, is preferably made of an elastic material. In the present embodiment, the entirety of the holding jig 60 is made of an elastic material. The elastic material may be, for example, rubber whose chief component is either nitrile-butadiene rubber (NBR) or chloroprene rubber (CR). The elastic material forming the holding jig 60 preferably has a hardness of 60 or greater. More preferably, the elastic material has a hardness of 70 or greater. The hardness of the elastic material is preferably 1300 or smaller, or may be 60 or greater and 1300 or smaller. The hardness of the elastic material is defined as a value measured with a type-A durometer in accordance with JIS K 6253-3:2012.

Now, the step (a) will be described. In the step (a), the peeling jig 50 is first attached to the sensor element 10. Specifically, the element body 20 is inserted into the through hole 51 of the peeling jig 50 from the rear-end side thereof (see FIG. 4A), and the peeling jig 50 is moved toward the front-end side in the longitudinal direction of the element body 20, whereby the peeling jig 50 is brought into contact with the rear end of the porous protection layer 30 (see FIG. 4B). In this state, the recesses 33 of the porous protection layer 30 and the projections 53 of the peeling jig 50 fit each other, respectively. Subsequently, the element body 20 is inserted into the through hole 61 of the holding jig 60 from the rear-end side thereof, whereby the holding jig 60 is attached to the sensor element 10 (see FIG. 4C). The holding jig 60 is positioned, for example, near the rear end of the element body 20 and is attached to a portion of the element body 20 where the porous protection layer 30 is absent. Thus, the porous protection layer 30, the peeling jig 50, and the holding jig 60 are arranged in that order in the axial direction (longitudinal direction) of the element body 20.

Subsequently, as illustrated in FIG. 3, the sensor element 10 is attached to the adhesive-strength-measuring machine 40. Specifically, the peeling jig 50 is pinched and fixed between the pinching members 43a of the peeling-jig-fixing unit 43, and the holding jig 60 is pinched and held between the pinching members 44a of the element-body-holding unit 44. In the present embodiment, the sensor element 10 is attached such that both the peeling-jig-fixing unit 43 and the element-body-holding unit 44 pinch the element body 20 in the thickness direction of the element body 20. If the step (a) is performed as above, the relationship among the sensor element 10, the peeling jig 50, and the holding jig 60 becomes as follows. As illustrated in FIG. 3, since the element-body-holding unit 44 pinches the holding jig 60, the holding jig 60 holds, with an elastic force thereof, the portion of the element body 20 where the porous protection layer 30 is absent. Meanwhile, the peeling jig 50 is fixed by the peeling-jig-fixing unit 43 independently of the sensor element 10 and the holding jig 60. Therefore, in the state illustrated in FIG. 3, the element body 20 is set in the through hole 51 and is movable relative to the peeling jig 50 in the longitudinal direction. However, when the porous protection layer 30 is moved toward the holding jig (in this case, upward) in the longitudinal direction, the porous protection layer 30 comes into contact with the end surface 52 of the peeling jig 50 and is prevented from moving.

After the step (a), the step (b) is performed. In the step (b), when, for example, a worker operates the display-and-operation unit 49 and issues an instruction to start the measurement, the control unit 48 controls the servo motor 46 to move the element-body-holding unit 44 upward at a predetermined speed. The speed may be 0.8 mm/sec or higher, 1.2 mm/sec or lower, or 0.8 mm/sec or higher and 1.2 mm/sec or lower. Since the element-body-holding unit 44 is moved upward, the holding jig 60 and the sensor element 10 move at the predetermined speed toward the rear-end side (in this case, vertically upward) in the longitudinal direction of the element body 20 (see FIG. 5A). In this process, since the peeling jig 50 is fixed by the peeling-jig-fixing unit 43 and is thus stationary, the holding jig 60 and the peeling jig 50 move relative to each other and away from each other in the longitudinal direction. Consequently, the end surface 52 of the peeling jig 50 pushes the porous protection layer 30 toward the front-end side of the element body 20 in the longitudinal direction, eventually causing the porous protection layer 30 to peel off the element body 20 (see FIG. 5B). Then, when the control unit 48 determines that an ending condition, such as the elapse of a predetermined time or an input of an ending instruction issued by the worker through the display-and-operation unit 49, is satisfied, the control unit 48 stops the servo motor 46. On the other hand, the control unit 48 receives a detection signal outputted from the load cell 47 while the element-body-holding unit 44 is being moved upward by the servo motor 46, stores the relationship between the time and the load [N], and displays the relationship on the display-and-operation unit 49. After the step (a) is performed and after the value of the load [N] in the state before the element-body-holding unit 44 is moved upward is adjusted to zero in advance, the control unit 48 measures the load [N] while the element-body-holding unit 44 is being moved upward. With reference to the thus measured load, the control unit 48 or the worker measures the adhesive strength [N] of the porous protection layer 30. For example, the load detected by the load cell 47 gradually increases with the elapse of time from the start of operation of the servo motor 46 and only starts to decrease when the porous protection layer 30 starts to peel off. Therefore, in the present embodiment, a first peak of the load that is derived with reference to the relationship between the time and the load is detected, and the value at the first peak is defined as the value of adhesive strength of the porous protection layer 30. The first peak may be detected as follows. First, about how much the load is reduced at the occurrence of peeling may be identified in advance on the basis of an experiment, and the thus identified value may be determined as a threshold. Then, ignoring small peaks whose degrees of reduction in the load are lower than the threshold, a peak at which the porous protection layer 30 is regarded as being peeled off for the first time may be taken as the first peak.

Figure 9A:
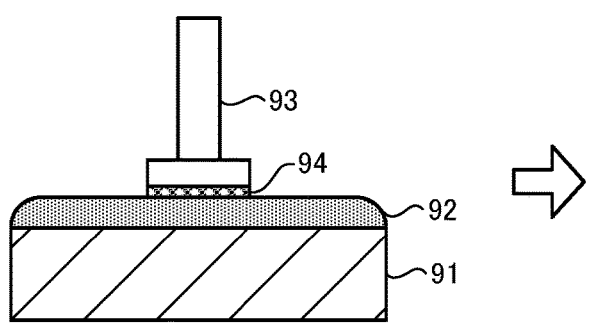
FIGS. 9A and 9B include diagrams illustrating the Sebastian method according to a prior art.
Figure 9B:
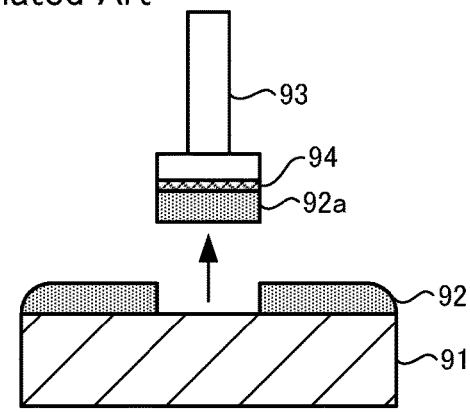

In the above method of measuring adhesive strength, the variation in the measured adhesive strength can be made smaller than in, for example, the Sebastian method, which is the prior-art method illustrated in FIGS. 9A and 9B. This is considered to be because of the following reason. In the Sebastian method, the stud pin 93 and the object of measurement (the film 92, for example) are bonded to each other with the adhesive 94. If the object of measurement is a porous body (in the present embodiment, the porous protection layer 30), the area of adhesion and the force of adhesion between the stud pin 93 and the porous protection layer 30 tend to vary with the degree of permeation of the adhesive 94 into pores of the porous protection layer 30. This variation varies the magnitude and the range of the force applied to the porous protection layer 30 when the stud pin 93 is moved upward. Consequently, the measured value varies. In the method of measuring adhesive strength according to the present embodiment, the adhesive strength can be measured without using the adhesive 94. Therefore, even if the object of measurement is the porous protection layer 30, the variation in the measured value is considered to be small.

In the step (b), when the end surface 52 of the peeling jig 50 pushes the porous protection layer 30 in the longitudinal direction, the recesses 33 of the first and second protection layers 30*a* and 30*b* and the projections 53 of the peeling jig 50 come into contact with each other and fit each other, respectively (see FIG. 4C). Hence, the porous protection layer 30 and the peeling jig 50 are prevented from moving relative to each other in a predetermined direction (in the present embodiment, the width direction) that is perpendicular to the longitudinal direction. Accordingly, the displacement between the porous protection layer 30 and the peeling jig 50 in the width direction that may occur in the step (b) is suppressed. Consequently, the variation in the measured adhesive strength can be made much smaller.

Figure 6:
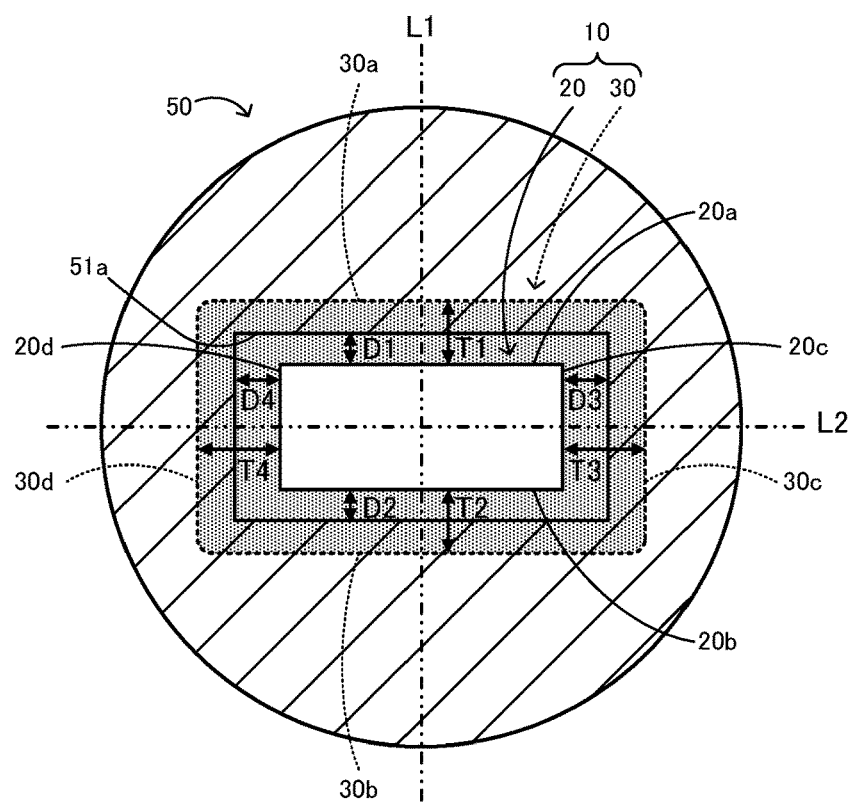
FIG. 6 is a diagram illustrating the positional relationship between the sensor element 10 and an inner circumferential surface 51a of the peeling jig 50.

Now, the size of the through hole 51 of the peeling jig 50 will be described in detail. FIG. 6 is a diagram illustrating the positional relationship between the sensor element 10 and the inner circumferential surface 51*a* of the peeling jig 50. FIG. 6 illustrates the sensor element 10 and the peeling jig 50 that are virtually seen in the longitudinal direction from the rear-end side of the element body 20 in a state where the step (a) is ended (that is, at the start of the step (b)). As illustrated in FIG. 6, the first to fourth protection layers 30*a* to 30*d* have respective thicknesses T1 to T4. The first to fourth surfaces 20*a* to 20*d* of the element body 20 are at respective distances D1 to D4 from the inner circumferential surface 51*a* of the peeling jig 50. The ratio of the gap between the inner circumferential surface 51*a* and the element body 20 with respect to the thickness of the porous protection layer 30 is defined as a gap ratio=(length of gap between inner circumferential surface 51*a* and element body 20)/(thickness of porous protection layer 30). The gap ratio is derived in a direction perpendicular to the surface of the element body 20. Therefore, in the present embodiment, the following gap ratios are obtained: a gap ratio R1 in a direction (along a line L1 illustrated in FIG. 6, or in the thickness direction) perpendicular to the first and second surfaces 20*a* and 20*b*, and a gap ratio R2 in a direction (along a line L2 illustrated in FIG. 6, or in the width direction) perpendicular to the third and fourth surfaces 20*c* and 20*d*. According to the above definition, the following holds: gap ratio R1=(D1+D2)/(T1+T2), and gap ratio R2=(D3+D4)/(T3+T4). The through hole 51 is sized such that the gap ratios R1 and R2 each become greater than 0 and smaller than 1. Thus, the through hole 51 has a size that allows the element body 20 to pass therethrough and prevents the porous protection layer 30 from passing therethrough. Hence, it is only necessary to insert the element body 20 into the through hole 51 in the step (a), whereby the peeling jig 50 is positioned in such a manner as to allow the movement of the element body 20 in the longitudinal direction and prevent the movement of the porous protection layer 30.

The gap ratios R1 and R2 are each preferably 0.3 or greater, more preferably 0.4 or greater. The gap ratios R1 and R2 are each preferably 0.7 or smaller, more preferably 0.6 or smaller. That is, the gap ratios R1 and R2 are each preferably 0.3 or greater and 0.7 or smaller. If the gap ratio R1 is 0.3 or greater, the occurrence of any fault due to the smallness of the through hole 51 can be suppressed. For example, the following advantageous effects are obtained. In the step (a), since a greater allowance for the displacement between the element body 20 and the peeling jig 50 in the thickness direction is provided for the insertion of the element body 20 into the through hole 51 of the peeling jig 50, the element body 20 can be easily inserted into the through hole 51 of the peeling jig 50. On the other hand, in the step (b), the occurrence of an error in the adhesive strength that may be caused by a frictional force generated at the contact between the peeling jig 50 and each of the two thickness-direction end faces (the first and second surfaces 20a and 20b) of the element body 20 can be suppressed. If the gap ratio R1 is 0.7 or smaller, the occurrence of any fault due to the largeness of the through hole 51 can be suppressed. As the gap ratio R1 becomes smaller, the first and second protection layers 30a and 30b provided at the two respective thickness-direction ends each have a larger area to be pushed by the end surface 52 of the peeling jig 50 (see FIG. 6 for the overlap between the hatched area of the peeling jig 50 and the hatched area of the porous protection layer 30). Therefore, if the gap ratio R1 is 0.7 or smaller, for example, the porous protection layer 30 can be more assuredly peeled off the element body 20 by using the peeling jig 50. That is, if the through hole 51 is too large, the peeling jig 50 may only damage surficial part of the porous protection layer 30 without peeling the porous protection layer 30 off the element body 20. However, if the gap ratio R1 is set to 0.7 or smaller, the occurrence of such a fault can be suppressed. The above advantageous effects are also obtained for the gap ratio R2 in the width direction. The gap ratios R1 and R2 are each preferably 0.3 or greater, more preferably 0.4 or greater. Furthermore, the gap ratios R1 and R2 are each preferably 0.7 or smaller, more preferably 0.6 or smaller. That is, the gap ratios R1 and R2 are each preferably 0.3 or greater and 0.7 or smaller. The distances D1 to D4 may each be, for example, 125 μm or greater or 175 μm or smaller.

The through hole 61 of the holding jig 60 only needs to be capable of receiving the element body 20 that is inserted thereinto and holding the element body 20 with its own elastic force by receiving a pressing force applied thereto from the element-body-holding unit 44. Therefore, for example, in a state where the element body 20 is set in the through hole 61 but is yet to be held by the element-body-holding unit 44, there may be a gap or no gap between the inner circumferential surface 61a and the element body 20.

In the method of measuring adhesive strength according to the present embodiment described in detail above, the peeling jig 50 is positioned between the porous protection layer 30 and the holding jig 60 in the step (a) so that, in the step (b) in which the holding jig 60 and the peeling jig 50 are moved relative to each other, the peeling jig 50 allows the element body 20 to move in the longitudinal direction and prevents the porous protection layer 30 from moving in the longitudinal direction. Thus, in the step (b), the peeling jig 50 prevents the porous protection layer 30 from moving. Therefore, the peeling jig 50 pushes the porous protection layer 30 toward the front-end side in the longitudinal direction of the element body 20, whereby the porous protection layer 30 is peeled off the element body 20. Then, with reference to the load applied to the holding jig 60 at the peeling, the adhesive strength of the porous protection layer 30 is measured. In this method of measuring adhesive strength, the variation in the measured adhesive strength can be made smaller than in, for example, the known Sebastian method illustrated in FIGS. 9A and 9B.

The peeling jig 50 has the through hole 51 into which the element body 20 is insertable. The through hole 51 has the size and shape that allows the portion of the element body 20 where the porous protection layer 30 is absent to pass therethrough in the longitudinal direction and prevents a portion of the sensor element 10 where the porous protection layer 30 is present from passing therethrough in the longitudinal direction. In the step (a), the peeling jig 50 is positioned by inserting the element body 20 into the through hole 51 of the peeling jig 50. If the through hole 51 has the above size and shape, when the element body 20 is inserted into the through hole 51 of the peeling jig 50, the peeling jig 50 can be positioned such that the element body 20 is allowed to move in the longitudinal direction while the porous protection layer 30 is prevented from moving. Thus, the peeling jig 50 can be positioned relatively easily.

The size and shape of the through hole 51 of the peeling jig 50 is also set such that the gap ratios R1 and R2 derived in the respective directions perpendicular to the surfaces (in the present embodiment, the first to fourth surfaces 20a to 20d) of the element body 20 each become 0.3 or greater and 0.7 or smaller. If the gap ratios R1 and R2 are each 0.3 or greater, at least one of the following advantageous effects is obtained, for example: the element body 20 can be easily inserted into the through hole 51 of the peeling jig 50 in the step (a), and the occurrence of an error in the adhesive strength that may be caused by the frictional force generated at the contact between the peeling jig 50 and the element body 20 in the step (b) can be suppressed. If the gap ratios R1 and R2 are each 0.7 or smaller, the porous protection layer 30 can be more assuredly peeled off the element body 20 by using the peeling jig 50.

The porous protection layer 30 and the peeling jig 50 have the recesses 33 and the projections 53, respectively, in portions thereof that are to come into contact with each other in the step (b). When the recesses 33 and the projections 53 fit each other, the porous protection layer 30 and the peeling jig 50 are prevented from moving relative to each other in a predetermined direction (in the present embodiment, the width direction) that is perpendicular to the longitudinal direction of the element body 20.

Therefore, the displacement between the porous protection layer 30 and the peeling jig 50 in the width direction that may occur in the step (b) is suppressed. Consequently, the variation in the measured adhesive strength can be made much smaller.

The hardness of the holding jig 60 is 60 or greater. Therefore, the coming off of the element body 20 from the holding jig 60 that may occur in the step (b) can be suppressed. If the hardness of the holding jig 60 is 1300 or smaller, the breakage of the element body 20 that may occur under the holding force exerted by the holding jig 60 can be suppressed.

If the speed at which the holding jig 60 and the peeling jig 50 move away from each other in the step (b) is set to 0.8 mm/sec or higher, the occurrence of a phenomenon other than peeling, such as slight and gradual damage to the porous protection layer 30, can be suppressed. Consequently, measurement accuracy is improved. If the speed is set to 1.2 mm/sec or lower, at least one of the following advantageous effects is obtained: the error in the load measurement that may be caused by high speed can be reduced, and the coming off of the element body 20 from the holding jig 60 can be suppressed.

The porous protection layer 30 (in the present embodiment, particularly the first to fourth protection layers 30a to 30d) has a thickness of 40 μm or greater. Therefore, the peeling jig 50 can easily push the porous protection layer 30 in the longitudinal direction in the step (b). That is, the porous protection layer 30 can be easily peeled off by using the peeling jig 50.

The porous protection layer 30 has a porosity of 20% or higher. In such a case, if the adhesive strength is measured by the Sebastian method, the measured value tends to vary because of the reasons described above. Therefore, the method of measuring adhesive strength according to the above embodiment is worth employing in such a case.

Needless to say, the present invention is not limited to the above embodiment in any way and may be embodied in any of various other ways within the technical scope thereof.

For example, while the above embodiment concerns a case where the peeling jig 50 and the holding jig 60 move relative to each other in the vertical direction in the step (b), the present invention is not limited to such a case. The peeling jig 50 and the holding jig 60 may move in the horizontal direction.

Figure 7A:
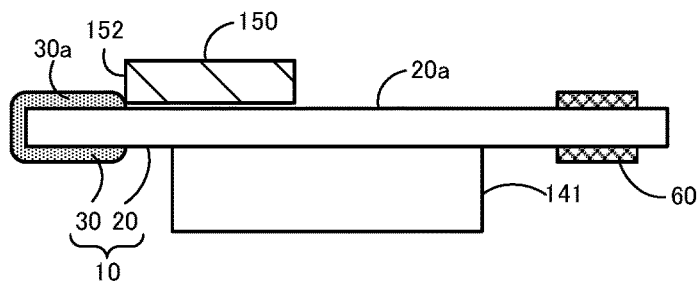
FIGS. 7A and 7B include diagrams illustrating a method of measuring adhesive strength according to a modification.
Figure 7A:
Figure 7B:
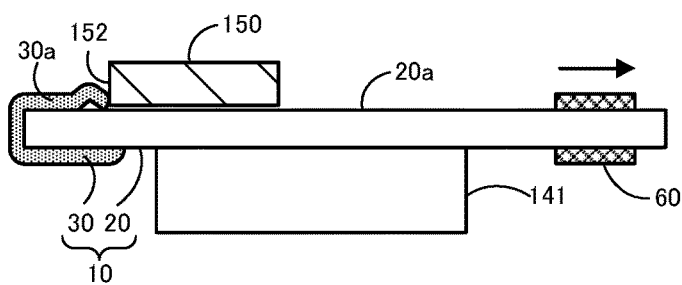

While the above embodiment concerns a case where the peeling jig 50 has the through hole 51 into which the element body 20 is insertable, the present invention is not limited to such a case. Even a peeling jig having no through hole can peel the porous protection layer 30 off in the step (b) by being positioned between the porous protection layer 30 and the holding jig 60 in the longitudinal direction in such a manner as to allow the element body 20 to move in the longitudinal direction and to prevent the porous protection layer 30 from moving in the longitudinal direction in the step (a). FIGS. 7A and 7B include diagrams illustrating a method of measuring adhesive strength modified for such a case. FIG. 7A illustrates a state after the step (a). FIG. 7B illustrates how the step (b) is performed. In FIG. 7A, the element body 20 of the sensor element 10 is placed on a table 141 such that the longitudinal direction thereof corresponds to the horizontal direction, and a peeling jig 150 having no through hole is placed on the element body 20 (in this modification, on the first surface 20a). Furthermore, as with the case of the above embodiment, the holding jig 60 is attached to a portion of the element body 20 that is near the rear end, whereby the peeling jig 150 is positioned between the porous protection layer 30 and the holding jig 60 in the longitudinal direction of the element body 20. The peeling jig 150 is fixed independently of the element body 20. The distance from the first surface 20a to the peeling jig 150 (corresponding to the distance D1 in FIG. 6) is smaller than the thickness T1 of the first protection layer 30a and 0 μm or greater, preferably greater than 0 μm. After the step (a) is performed as described above, the step (b) is performed as follows. The peeling jig 150 and the holding jig 60 are moved relative to each other and away from each other in the longitudinal direction of the element body 20 (in this modification, in the horizontal direction), whereby the first protection layer 30a is pushed by an end surface 152 of the peeling jig 150 and is thus peeled off the first surface 20a (see FIG. 7B). Then, with reference to the load applied in this state to at least one of the holding jig 60 and the peeling jig 150, the adhesive strength of the porous protection layer 30 (in this modification, particularly the first protection layer 30a) is measured. In such a method as well, the adhesive strength can be measured without using any adhesive, as with the case of the above embodiment. Note that while the above embodiment concerns a case where the adhesive strength of particularly the first to fourth protection layers 30a to 30d are to be measured among the layers included in the porous protection layer 30, the modification illustrated in FIGS. 7A and 7B concerns a case where the adhesive strength of particularly the first protection layer 30a is to be measured among the layers included in the porous protection layer 30. Therefore, the measured value of adhesive strength is different between the two cases. In the modification illustrated in FIGS. 7A and 7B, the load measured contains the kinetic frictional force generated between the table 141 and the element body 20. If the kinetic frictional force is small, the kinetic frictional force may be ignored. Alternatively, the kinetic frictional force may be measured in advance and be subtracted from the measured load, and the resulting value may be taken as the adhesive strength.

Figure 8:
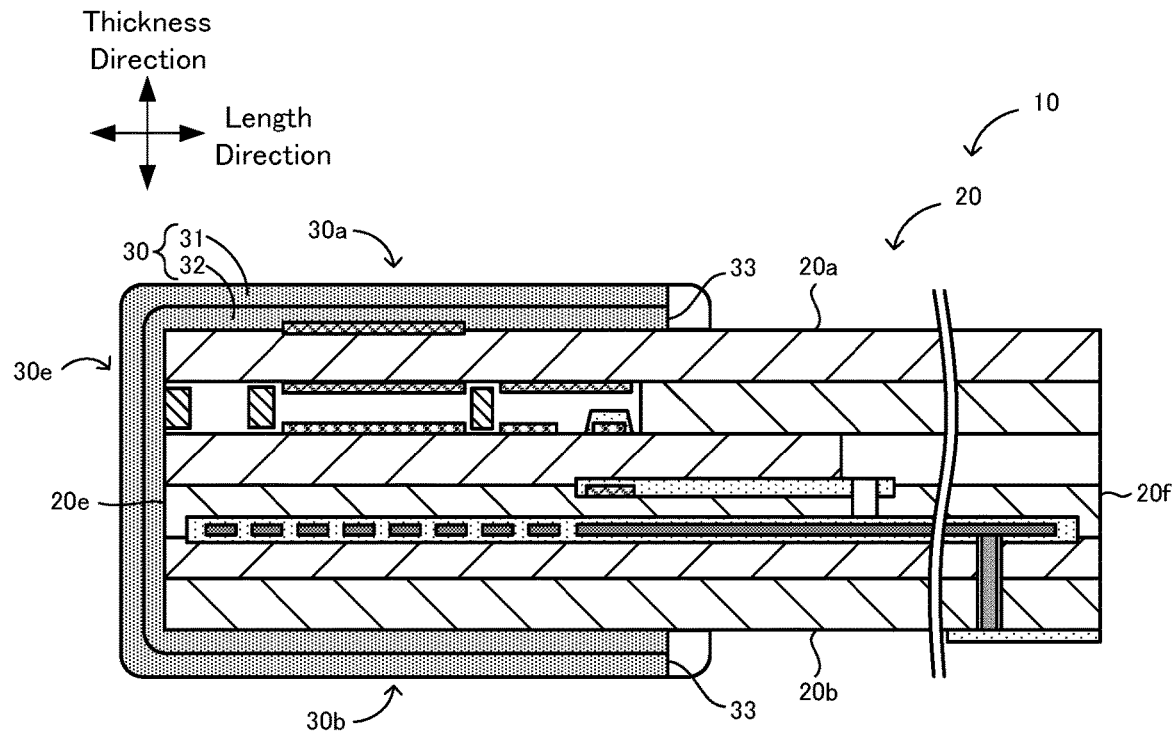
FIG. 8 is a sectional view of a sensor element 10 according to another modification.

In the above embodiment, the porous protection layer 30 may include a plurality of layers stacked in the thickness direction. For example, as illustrated in FIG. 8, the porous protection layer 30 may include an outer protection layer 31 and an inner protection layer 32. The outer protection layer 31 and the inner protection layer 32 may have different values of thickness, porosity, or the like, or may be made of different materials.

While the above embodiment concerns a case where the element body 20 has a rectangular-parallelepiped shape, the present invention is not limited to such a case. For example, the element body 20 may have a cylindrical shape.

While the above embodiment concerns a case where the porous protection layer 30 and the peeling jig 50 have the recesses 33 and the projections 53, respectively, serving as preventing portions that prevent the porous protection layer 30 and the peeling jig 50 from moving relative to each other, at least one of the set of recesses 33 and the set of projections 53 may be omitted. While the recesses 33 and the projections 53 according to the above embodiment prevent the movements of the porous protection layer 30 and the peeling jig 50 in the width direction, the porous protection layer 30 and the peeling jig 50 may include respective preventing portions that prevent the movements thereof in the thickness direction.

While the above embodiment concerns a case where, in the step (b), the holding jig 60 is moved with the peeling jig 50 being fixed, it is only necessary that the peeling jig 50 and the holding jig 60 move relative to each other and away from each other in the longitudinal direction of the element body 20. For example, only the peeling jig 50 may be moved, or both the peeling jig 50 and the holding jig 60 may be moved.

While the above embodiment concerns a case where the load applied to the holding jig 60 is measured with the load cell 47, the present invention is not limited to such a case. The adhesive strength only needs to be measured with reference to the load applied to at least one of the holding jig 60 and the peeling jig 50.

While the above embodiment concerns a case where the end surface 52 of the peeling jig 50 and the porous protection layer 30 are in contact with each other at the end of the step (a), the present invention is not limited to such a case. The end surface 52 and the porous protection layer 30 may come into contact with each other after the holding jig 60 starts to be moved in the step (b).

While the above embodiment concerns a case where the porous protection layer 30 includes the first to fifth protection layers 30a to 30e, the present invention is not limited to such a case. The porous protection layer 30 only needs to cover at least part of any of the surfaces (in the case illustrated in FIG. 1, the first to fourth surfaces 20a to 20d) of the element body 20 that extend in the longitudinal direction. For example, the fifth protection layer 30e of the porous protection layer 30 may be omitted. Alternatively, the porous protection layer 30 may include only the first protection layer 30a.

While the above embodiment concerns a case where the entirety of the holding jig 60 is made of an elastic material, the present invention is not limited to such a case. The holding jig 60 only needs to be capable of holding the element body 20 with an elastic force. For example, the holding jig 60 does not need to be entirely made of an elastic material and may include an elastic member in a portion that comes into contact with the element body 20. While the above embodiment concerns a case where the holding jig 60 is a single member that encloses and thus holds the element body 20, the present invention is not limited to such a case. The holding jig 60 may include a plurality of members that pinch the element body 20 therebetween. For example, at least part of each of the pinching members 43a of the adhesive-strength-measuring machine 40 that comes into contact with the element body 20 may be made of an elastic material. In such a case, the pair of pinching members 43a corresponds to the holding jig 60.

While the above embodiment concerns a case where the element body 20 is first inserted into the through hole 51 of the peeling jig 50 and is then fixed by the peeling-jig-fixing unit 43, the present invention is not limited to such a case. The peeling jig 50 may first be fixed by the peeling-jig-fixing unit 43. Moreover, the peeling jig 50 may be, for example, integrated with the peeling-jig-fixing unit 43. That is, the peeling jig 50 may be a portion integrally included in the adhesive-strength-measuring machine 40.

While the above embodiment concerns a case where the peeling jig 50 is a substantially round columnar member, the present invention is not limited to such a case. The peeling jig 50 may be a non-round columnar member. For example, the peeling jig 50 may be a polygonal columnar member such as a rectangular columnar member.

EXAMPLES

Specific examples of the method of measuring adhesive strength will now be described as working examples. The present invention is not limited to the following working examples.

[Manufacturing Sensor Elements A to E]

First, different sensor elements 10 were manufactured as objects of adhesive-strength measurement and were defined as sensor elements A to E. The porous protection layer 30 of each of the sensor elements A to E included two layers, namely an outer protection layer 31 and an inner protection layer 32, as with the case of the modification illustrated in FIG. 8. The sensor element A was manufactured as follows. First, an element body 20, illustrated in FIGS. 1 and 2, was manufactured in such a manner as to have a length of 67.5 mm, a width of 4.25 mm, and a thickness of 1.45 mm. The element body 20 was obtained as follows. Zirconia particles with 4 mol % of yttria as a stabilizer added thereto, an organic binder, and an organic solvent were mixed together, and the mixture was formed into six ceramic green sheets by tape casting. Subsequently, patterns of electrodes and so forth were printed on each of the green sheets, and the green sheets were stacked one on top of another, whereby a multilayer body was obtained. Furthermore, a layer of slurry serving as the inner protection layer 32 was formed on the multilayer body by screen printing. The slurry was prepared by mixing raw-material powder (alumina powder), a binder solution, a solvent (acetone), and a pore-forming material. Subsequently, the multilayer body was fired, whereby an element body 20 having the inner protection layer 32 was obtained. Subsequently, an outer protection layer 31 was formed on the outer side of the inner protection layer 32 by plasma spraying performed with SinplexPro-90 of Oerlikon Metco. The material sprayed was alumina powder. The thickness of the inner protection layer 32 was set to 0.05 mm. The thicknesses T1 to T4 of the porous protection layer 30 (the total thickness of the outer protection layer 31 and the inner protection layer 32) were each set to 0.3 mm. The porosity of the outer protection layer 31 was set to 20%. The porosity of the inner protection layer 32 was set to 40%. The distance from the fifth surface 20e of the element body 20 to the rear end of the porous protection layer 30 was set to 12.0 mm. The depth of each of the recesses 33 of the first and second protection layers 30a and 30b was set to 0.5 mm. The sensor elements B to E were manufactured in the same manner as in the case of the sensor element A, except that the amount and the particle size of the pore-forming material contained in the slurry for forming the inner protection layer 32 were changed appropriately, and the porosity of the inner protection layer 32 was changed appropriately within a range of 20% to 50%.

Working Example 1

The adhesive-strength measurement including the steps (a) and (b) described above was conducted on each of the sensor elements A to E as Working Example 1. First, a peeling jig 50 and a holding jig 60 were prepared. The peeling jig 50 had a diameter of 8.7 mm, with a through hole 51 having an opening size of 1.7 mm by 4.6 mm and an axial length of 10 mm. The peeling jig 50 was made of SKD11. The projections 53 of the peeling jig 50 each had a height of 0.5 mm, the same as the depth of the recesses 33, so as to conform to the recesses 33. The holding jig 60 was shaped as a rectangular-parallelepiped body having a size of 3.45 mm by 6.25 mm by 14.5 mm. The through hole 61 had an opening size of 1.45 mm by 4.25 mm and an axial length of 14.5 mm. The holding jig 60 was made of NBR70. The hardness of the holding jig 60 that was measured with a type-A durometer in accordance with JIS K 6253-3:2012 was 70.

In the step (a), as with the case illustrated in FIGS. 4A to 4C, the peeling jig 50 and the holding jig 60 were first attached to the sensor element 10, and the peeling jig 50 and the holding jig 60 were then attached to a tension-testing machine (INSTRON 5566 of INSTRON). Thus, the peeling jig 50 was fixed while the holding jig 60 was allowed to move up and down, as with the case illustrated in FIG. 3. In this state, as can be understood from the above-described dimensions of the element body 20 and the through hole 51 of the peeling jig 50, the distances D1 and D2 illustrated in FIG. 6 were each 0.125 mm, and the distances D3 and D4 were each 0.175 mm. Accordingly, the gap ratio R1 was (0.125 mm+0.125 mm)/(0.3 mm+0.3 mm)=0.42, and the gap ratio R2 was (0.175 mm+0.175 mm)/(0.3 mm+0.3 mm)=0.58.

In the step (b), the holding jig 60 was moved upward at a speed of 1 mm/sec. Thus, the peeling jig 50 pushed the porous protection layer 30, and the porous protection layer 30 was peeled off. The relationship between the load [N] applied to the holding jig 60 and the time in this step was measured, and the value at the first peak of the load was taken as the adhesive strength [N] of the porous protection layer 30. The steps (a) and (b) described above were performed for each of the sensor elements A to E. Seven samples were manufactured as sensor elements A, and the adhesive strength was measured for each of the seven samples. Furthermore, the coefficient of variation (=standard deviation/arithmetic mean) was calculated as a value representing the variation in the measured value. Likewise, eight samples, six samples, six samples, and fourteen samples were manufactured as sensor elements B, C, D, and E, respectively, and the adhesive strength was measured for each of the samples. Furthermore, the coefficient of variation was calculated for each of the sensor elements B to E. In Working Example 1, the element body 20 did not come off the holding jig 60 in the step (b).

Comparative Example 1

In Comparative Example 1, the adhesive strength of the porous protection layer 30 was measured by the Sebastian method, illustrated in FIGS. 9A and 9B, for each of the sensor elements A to E. The diameter of the lower surface of the stud pin 93 that was to be bonded to the porous protection layer 30 was set to 3.2 mm. The stud pin 93 was made of alumina. Epoxy adhesive was employed as the adhesive 94. In Comparative Example 1, the adhesive 94 was first applied to the lower surface of the stud pin 93, and the stud pin 93 was pressed against the surface of the first protection layer 30a at 200° C. for 30 minutes, whereby the stud pin 93 and the first protection layer 30a were bonded to each other. Subsequently, the element body 20 and the stud pin 93 were attached to a tension-testing machine (AG-250kN of SHIMADZU), and the stud pin 93 was moved upward at a speed of 1 mm/sec. Thus, part of the first protection layer 30a was pulled together with the stud pin 93 and was peeled off the first surface 20a. Then, the relationship between the load [N] applied to the stud pin 93 and the time in this step was measured, and the value at the first peak of the load was taken as the adhesive strength [N] of the porous protection layer 30. The above process was performed for each of the sensor elements A to E. Five samples were manufactured for each of the sensor elements A to E. For each of the sensor elements A to E, the adhesive strength was measured, and the coefficient of variation was calculated as a value representing the variation in the measured value.

[Comparison of Variation in Measured Value Between Working Example 1 and Comparative Example 1]

For each of the sensor elements A to E, the rate of reduction [%] in the coefficient of variation in Working Example 1 from that in Comparative Example 1 was calculated as follows: rate of reduction=((coefficient of variation in Comparative Example 1)−(coefficient of variation in Working Example 1))/(coefficient of variation in Comparative Example 1)×100%. The results are summarized in Table 1. As can be understood from Table 1, for each of the sensor elements A to E, the coefficient of variation in Working Example 1 was reduced by 60% or more from that in Comparative Example 1, making the variation in the measured value in Working Example 1 small. In Comparative Example 1, even among sensor elements of the same kind, there were variations in the size of the part of the porous protection layer 30 that was peeled off by being pulled together with the stud pin 93. This is considered to be because the area and the force of adhesion between the stud pin 93 and the porous protection layer 30 vary with the degree of permeation of the adhesive 94 into pores of the porous protection layer 30. Accordingly, the coefficient of variation in Comparative Example 1 was relatively large. In Working Example 1, it is considered that since no adhesive was used, the occurrence of such a variation was suppressed, and the coefficient of variation was therefore small.

TABLE 1

| | The rate of reduction [%] in the coefficient of variation in Working Example 1 from that in Comparative Example 1 |
|---|---|
| Sensor element A | 61.77 |
| Sensor element B | 83.01 |
| Sensor element C | 96.24 |
| Sensor element D | 63.98 |
| Sensor element E | 65.64 |

Working Example 2 and Comparative Example 2

As Working Example 2 and Comparative Example 2, the adhesive-strength measurement was conducted in the same manner as in Working Example 1, except that the material of the holding jig 60 was changed. In Working Example 2, the holding jig 60 was made of CR65. In Comparative Example 2, the holding jig 60 was made of CR45. The hardness of the holding jig 60 measured with a type-A durometer in accordance with JIS K 6253-3:2012 was 60 for Working Example 2 and 45 for Comparative Example 2. The adhesive-strength measurement was conducted ten times for Working Example 2. Consequently, the adhesive strength was successfully measured without the element body 20 coming off the holding jig 60, as with the case of Working Example 1. In Comparative Example 2, the pressing force with which the element body 20 was held with the aid of the holding jig 60 was increased to such a level as not to break the element body 20. However, the element body 20 came off the holding jig 60 in the step (b). Considering these results, the hardness of the holding jig 60 is preferably 60 or greater.

The present application claims priority from Japanese Patent Application No. 2018-001443, filed on Jan. 9, 2018, the entire contents of which are incorporated herein by reference.

What is claimed is:

1. A method of measuring adhesive strength between an element body and a porous protection layer that are included in a sensor element configured to detect a concentration of a specific gas contained in a measurement-object gas, the element body having a long shape, the porous protection layer covering part of a surface of the element body that extends in a longitudinal direction of the element body, the method comprising:
(a) a step of holding a portion of the element body where the porous protection layer is absent with an elastic force exerted by a holding jig, and placing a peeling jig at a position between the porous protection layer and the holding jig in the longitudinal direction such that the element body is allowed to move in the longitudinal direction while the porous protection layer is prevented from moving in the longitudinal direction toward the holding jig; and
(b) a step of moving, after the step (a), the holding jig and the peeling jig relative to each other and away from each other in the longitudinal direction such that the peeling jig pushes the porous protection layer in the longitudinal direction, and measuring the adhesive strength of the porous protection layer with reference to a load applied to at least one of the holding jig and the peeling jig when the porous protection layer peels off the element body.

2. The method of measuring adhesive strength according to claim 1,
wherein the peeling jig has a through hole into which the element body is insertable,
wherein the through hole has a size and shape that allows the portion of the element body where the porous protection layer is absent to pass through the through hole in the longitudinal direction and prevents a portion of the sensor element where the porous protection layer is present from passing through the through hole in the longitudinal direction, and
wherein, in the step (a), the peeling jig is positioned by inserting the element body into the through hole.

3. The method of measuring adhesive strength according to claim 2,
wherein the through hole of the peeling jig has a size and shape with which a gap ratio defined as (a length of a gap between an inner circumferential surface of the through hole and the element body)/(a thickness of the porous protection layer) and derived in a direction perpendicular to the surface of the element body becomes 0.3 or greater and 0.7 or smaller in a state where the element body is inserted into the through hole in the step (a).

4. The method of measuring adhesive strength according to claim 1,
wherein the porous protection layer and the peeling jig have respective preventing portions at respective positions that come into contact with each other in the step (b), the preventing portions preventing, when fitting each other, the porous protection layer and the peeling jig from moving in a predetermined direction perpendicular to the longitudinal direction.

5. The method of measuring adhesive strength according to claim 1,
wherein the holding jig includes an elastic member in a portion that comes into contact with the element body in the step (a), the elastic member having a hardness of 60 or greater and 1300 or smaller, the hardness being measured with a type-A durometer in accordance with JIS K 6253-3:2012.

6. The method of measuring adhesive strength according to claim 1,
wherein a speed at which the holding jig and the peeling jig move away from each other in the step (b) is set to 0.8 mm/sec or higher and 1.2 mm/sec or lower.

7. The method of measuring adhesive strength according to claim 1,
wherein the porous protection layer has a thickness of 40 μm or greater and 800 μm and smaller.

8. The method of measuring adhesive strength according to claim 1,
wherein the porous protection layer has a porosity of 20% or higher and 50% or lower.

* * * * *